(12) United States Patent
Rembold et al.

(10) Patent No.: US 7,401,593 B2
(45) Date of Patent: Jul. 22, 2008

(54) HIGH-PRESSURE FUEL PUMP WITH A PRESSURE RELIEF VALVE

(75) Inventors: Helmut Rembold, Stuttgart (DE); Peter Ropertz, Oberriexingen (DE); Victorio Toscano, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 159 days.

(21) Appl. No.: 11/069,023

(22) Filed: Mar. 2, 2005

(65) Prior Publication Data
US 2005/0205065 A1    Sep. 22, 2005

(30) Foreign Application Priority Data
Mar. 17, 2004 (DE) .................. 10 2004 013 307

(51) Int. Cl.
*F02M 59/46* (2006.01)
(52) U.S. Cl. ..................... 123/467; 123/446

(58) Field of Classification Search ............... 123/467, 123/506, 468, 469, 509, 198 D, 446; 137/512, 137/513.7; 417/493, 494, 499
See application file for complete search history.

(56) References Cited

U.S. PATENT DOCUMENTS

| | | | | |
|---|---|---|---|---|
| 2,090,781 | A * | 8/1937 | Camner | 417/494 |
| 2,247,421 | A * | 7/1941 | Tabb et al. | 123/446 |
| 4,926,902 | A * | 5/1990 | Nakamura et al. | 137/493.3 |
| 5,015,160 | A * | 5/1991 | Hlousek et al. | 417/499 |
| 5,950,669 | A * | 9/1999 | Fehlmann et al. | 137/493.3 |
| 6,135,090 | A * | 10/2000 | Kawachi et al. | 123/446 |
| 6,637,410 | B2 * | 10/2003 | Onishi et al. | 123/467 |
| 6,792,915 | B2 * | 9/2004 | Rembold et al. | 123/446 |

* cited by examiner

*Primary Examiner*—Carl S Miller
(74) *Attorney, Agent, or Firm*—Ronald E. Greigg

(57) ABSTRACT

A high-pressure fuel pump with a pressure relief valve which has improved hydraulic properties and a reduced number of high-pressure sealing points.

17 Claims, 4 Drawing Sheets

HIGH-PRESSURE FUEL PUMP WITH A PRESSURE RELIEF VALVE

BACKGROUND OF THE INVENTION

1. Field of the Invention

The invention relates to a high-pressure fuel pump with a delivery chamber that is connected on the intake side via an intake valve to a low-pressure fuel line and is connected on the pressure side via a high-pressure connection to a high-pressure fuel line, in which a check valve and a pressure relief valve connected parallel to it are provided between the delivery chamber contained in a housing and the high-pressure connection connected in a fluid-tight manner to the housing, and the pressure relief valve is contained in a blind hole bore of the housing.

2. Description of the Prior Art

A high-pressure fuel pump of the type with which this invention is concerned is known from DE 103 27 411, which was published after the priority date of the present application. The advantage of this high-pressure fuel pump is that the pressure relief valve does not open during the delivery stroke and consequently, transient pressure peaks that occur during the delivery stroke of the high-pressure fuel pump do not reduce the volumetric efficiency of the high-pressure fuel pump. Only during the intake stroke when a much lower pressure prevails in the delivery chamber than in the high-pressure fuel line does the pressure relief valve open if the high-pressure fuel line contains an impermissibly high pressure, thus effectively protecting the high-pressure fuel pump and the entire high-pressure region of the fuel injection system from impermissibly high pressures.

Another feature of the high-pressure fuel pump according to the invention is that the blind hole bore that contains the pressure relief valve starts from a chamber delimited by the high-pressure connection and the housing.

OBJECT AND SUMMARY OF THE INVENTION

It is possible to integrate the pressure relief valve into the housing of the high-pressure fuel pump, without an additional high-pressure sealing point in the high-pressure region of the high-pressure fuel pump. This achieves significant cost savings and also reduces the number of high-pressure sealing points since a check valve is already provided between the high-pressure connection and the delivery chamber. In other words, according to the invention, the check valve and the pressure relief valve can be mounted in the housing before the high-pressure connection assembly is installed onto the housing and connected to it in a pressure-tight manner. The high-pressure connection can be welded to the housing or screwed into it.

The high-pressure fuel pump according to the invention is consequently very simple in design and particularly well-suited to a maximally automated series production since the check valve and the pressure relief valve are mounted close to each other in the housing of the high-pressure fuel pump and as a rule, the mounting direction of the pressure relief valve and that of the check valve are aligned parallel to each other. All of these features significantly simplify production, particularly mass production, of the high-pressure fuel pump according to the invention.

In addition, the high-pressure fuel pump according to the invention has a very advantageous operating behavior, which will be evident from the following explanations:

The pressure relief valve according to the invention is prevented from opening in an undesirable fashion in that the pressure pulsations produced by the high-pressure pump during the delivery stroke act on the valve element from both sides, i.e. from both the inlet and outlet. As a result of this, the pressure pulsations, whose maximum can be considerably higher than the opening pressure of the pressure relief valve, do not produce a resultant hydraulic force on the valve element. This assures that the valve element does not lift up from its valve seat during the delivery stroke and consequently, the pressure relief valve does not open.

The pressure relief valve according to the invention also prevents the occurrence of impermissibly high pressures in the high-pressure region of the fuel system during the intake stroke of the high-pressure pump. Precisely stated, the check valve between the delivery chamber of the high-pressure pump and the high-pressure region of the fuel system is closed during the intake stroke and a possibly increased pressure in the high-pressure region of the fuel system opens the valve element of the pressure relief valve so that a pressure decrease occurs.

Another advantageous embodiment of the invention includes the provision that the pressure relief valve has a housing with a valve seat and a spring chamber, that the spring chamber contains a spring, which rests against the housing at one end and rests against the valve element at the other end, that the spring chamber is hydraulically connected to the outlet, that the valve seat is disposed in a seat sleeve, and that the seat sleeve is fastened in a blind hole bore of the housing. This exemplary embodiment is particularly simple from a production engineering standpoint since a spring, the valve element, and the seat sleeve need only be inserted into the blind hole bore that is provided anyway. The opening pressure of the pressure relief valve can be set by selecting the depth at which the seat sleeve is fastened in the blind hole bore, whether by means of welding, press-fitting, or caulking.

The production of the pressure relief valve is further simplified if the valve seat is disposed in a seat sleeve and this seat sleeve is attached in a blind hole bore of the housing, for example by being press-fitted and/or welded in place.

Another embodiment is characterized in that the pressure relief valve has a spring retainer and in that a spring is provided between the spring retainer and the valve seat, which rests against the spring retainer at one end and rests against the valve element at the other end, thus allowing the pressure relief valve to be integrated into the high-pressure fuel pump in different installation positions. This also simplifies the production of the pressure relief valve.

Another modification of the invention includes the provision that the spring retainer is connected to the seat sleeve so that the production, testing, and calibration of the pressure relief valve can occur outside the high-pressure fuel pump. In addition, the operating behavior of the high-pressure fuel pump is improved if the opening pressure of each pressure relief valve is measured and set before installation.

Alternatively, the spring retainer can also be attached to the bottom of the blind hole bore of the housing, thus reducing the number of components. The spring retainer can also be provided with a supporting arbor to prevent the spring from moving out of the way laterally.

The pressure relief valve according to the invention is particularly suited for use in a one-cylinder piston pump. The delivery pulsations are particularly pronounced in a high-pressure pump of this kind, so the action of the pressure relief valve according to the invention is particularly effective in this kind of pump.

BRIEF DESCRIPTION OF THE DRAWINGS

The invention will be better understood and further objects and advantages thereof will become more apparent from the ensuing detailed description of preferred embodiments, taken in conjunction with the drawings, in which.

DESCRIPTION OF THE PREFERRED EMBODIMENTS

Figure 1:
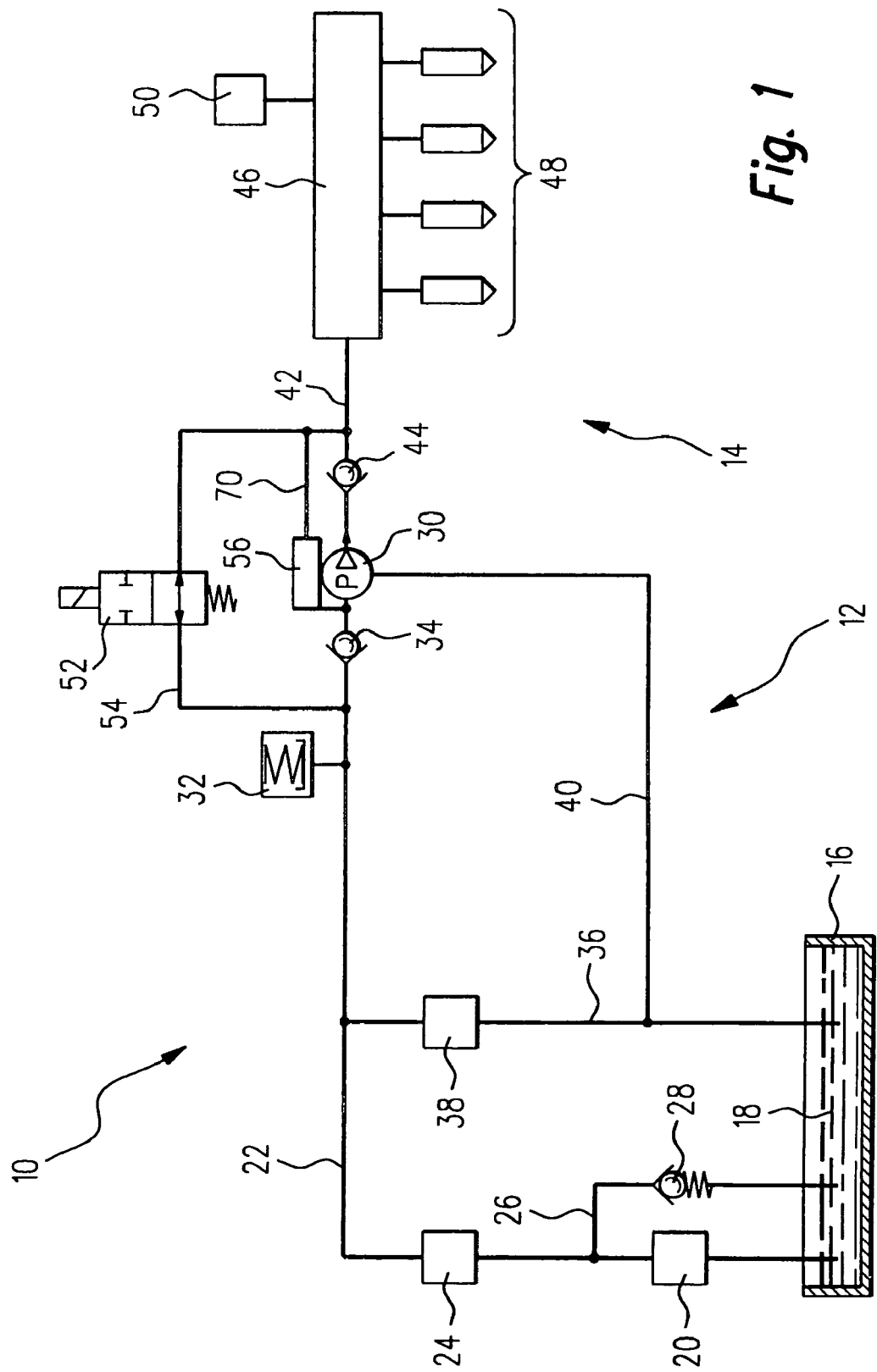
FIG. 1 is a schematic representation of a fuel system with a fuel pump that has a pressure relief valve attached to it.

In FIG. 1, a fuel system is labeled as a whole with reference numeral 10, and includes a low-pressure region 12 and a high-pressure region 14. The low-pressure region 12 includes a tank 16 in which fuel 18 is stored. The fuel 18 is fed from the tank 16 by a first fuel pump 20, which is an electric fuel pump. The electric fuel pump 20 feeds into a low-pressure fuel line 22 provided with a filter 24 downstream of the electric fuel pump 20. Upstream of the filter 24, a first branch line 26 branches off from the low-pressure fuel line 22 and leads back to the tank 16. The first branch line 26 contains a pressure relief device 28.

The low-pressure line 22 leads to a high-pressure pump 30, which is driven in a manner not shown here by the camshaft of an internal combustion engine, not shown. The high-pressure pump 30 is a one-piston high-pressure pump. Upstream of the high-pressure pump 30 a pressure damper 32 and an intake valve 34 are also provided in the low-pressure fuel line 22. Between the filter 24 and the pressure damper 32, a second branch line 36 that contains a low-pressure regulator 38 branches off from the low-pressure fuel line 22. The second branch line 36 also leads to the tank 16. A leakage line 40 leads from the high-pressure pump 30 to the second branch line 36.

On the outlet side, the high-pressure pump 30 feeds into a high-pressure fuel line 42, which leads via a check valve 44 to a fuel accumulator 46. The fuel accumulator 46 is in turn connected to fuel injection valves 48, which inject the fuel into a combustion chamber, not shown, of the engine. A pressure sensor 50 detects the pressure in the fuel accumulator 46.

In order to improve the operating behavior of the high-pressure region 14 of the fuel system 10, a throttle (not shown) can be provided in the high-pressure fuel line 42 upstream of the fuel accumulator 46. The throttle reduces pressure fluctuations and an undesirable noise generation in the high-pressure region 14.

In the exemplary embodiment according to FIG. 1, the pressure in the high-pressure fuel line 42 and the high-pressure accumulator 46, i.e. in the high-pressure region 14 of the fuel system 10, is controlled by means of a quantity control valve 52 connected to the high-pressure side. This valve connects the region of the high-pressure fuel line 42 disposed between the check valve 44 and the fuel accumulator 46 to the region of the low-pressure fuel line 22 disposed between the intake valve 34 and the pressure damper 32. The connection is provided by a third branch line 54. The quantity control valve 52 is triggered by a control and regulating unit not shown in FIG. 1, which in turn receives signals from the pressure sensor 50. This provides a closed control loop for controlling the pressure in the high-pressure region 14 of the fuel system 10. FIGS. 4 to 8 show a pressure relief valve provided on the intake side to control the pressure regulation in the high-pressure region.

Figure 2:
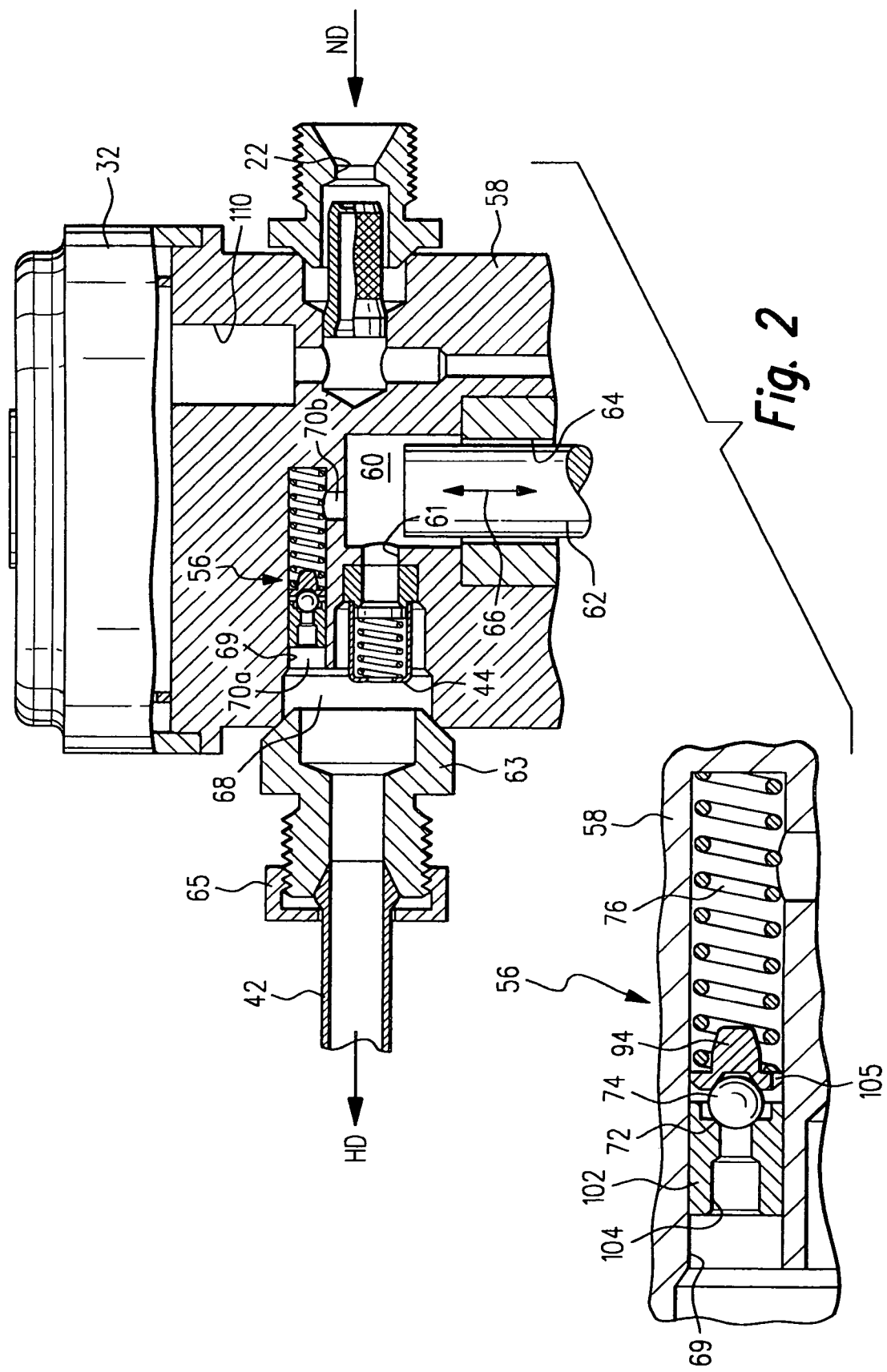
FIG. 2 is a section through a region of the high-pressure pump and a first exemplary embodiment of a pressure relief valve from FIG. 1.

In the event of the failure of the quantity control valve 52, a pressure relief valve 56 is integrated into the high-pressure pump 30 in order to prevent an excess pressure in the fuel accumulator 46 that could impair the functional capability of the injection valves 48. The design and function of the pressure relief valve 56 will be explained below in conjunction with FIG. 2 and FIGS. 4 to 8:

FIG. 2 shows a first exemplary embodiment of a pressure relief valve 56 according to the invention, which is integrated into a housing 58 of the high-pressure pump 30. The housing 58 contains a delivery chamber 60 that is delimited on one side by a piston 62 of the high-pressure pump 30. The piston 62 is driven to oscillate in a bore 64 of the housing 58. The drive mechanism of the piston 62 is not shown in FIG. 2. A double arrow 66 in FIG. 2 indicates the oscillating motion of the piston 62.

The sectional view of the high-pressure pump 30 depicted in FIG. 2 does not show the quantity control valve 52 and the hydraulic connection between the low-pressure fuel line 22 and the delivery chamber 60, with the intake valve 34 connected between them, but does clearly show the hydraulic connection between the pressure damper 32 and the low-pressure fuel line 22 by means of a connecting bore 110, which is embodied in the form of a stepped bore.

The delivery chamber 60 is hydraulically connected to the high-pressure fuel line 42 via a stepped bore 61 in the housing 58 and a high-pressure connection 63 tightly connected to the housing 58. The high-pressure fuel line 42 is connected to the high-pressure connection 63 by means of a clamping nut 65. The check valve 44 is press-fitted into the stepped bore 61.

The high-pressure connection 63, the housing 58, and the check valve 44 delimit a chamber 68. A blind hole bore 69 is drilled into the housing 58 starting from this chamber 68. The pressure relief valve 56 according to the invention is contained in this blind hole bore, which constitutes a section 70a of the fourth branch line 70. Between the delivery chamber 60 and the blind hole bore 69, a connecting bore is provided, which constitutes a section 70b of the fourth branch line 70.

The blind hole bore 69 can also be embodied as a stepped bore (not shown), in which case seat sleeve 102 is press-fitted into the stepped bore so that it is affixed in the axial direction against a shoulder of the stepped bore. The position of this shoulder determines the opening pressure of the pressure relief valve.

In the exemplary embodiment shown in FIG. 2, the pressure relief valve 56 is embodied in the form of a ball valve. According to the invention, however, other forms of seat valves and even slide valves can also be used.

The lower part of FIG. 2 shows an enlargement of the pressure relief valve 56 according to the invention and the components of the pressure relief valve 56 are provided with reference numerals. For the sake of clarity, these reference numerals are not fully represented in the upper part of FIG. 2, which shows the pressure relief valve 56 installed in the housing 58. The pressure relief valve 56 is essentially comprised of a spring 76 that rests against the housing 58 at one end and rests against a spring plate 94 at the other end. The spring plate in turn rests against a valve element 74, which the spring 76 presses into a valve seat 72 of a seat sleeve 102. The seat sleeve 102 contains a bore 104. A number of grooves 105 are provided distributed over the circumference of the spring plate 94 so that fuel can flow through the bore 104, past the valve element 74, and through the grooves 105 of the spring plate 94 as soon as the pressure of the fuel (not shown) in the bore 104 is sufficient to exceed the spring force that the spring 76 exerts on the valve element 74. It is naturally also possible to omit the grooves 105 and to provide a corresponding amount of play between the spring plate 94 and the blind hole bore 69 in the housing 58, thus allowing the fuel to flow through the pressure relief valve 56 and back into the delivery chamber 60 (see FIG. 2 top) as soon as the pressure in the high-pressure fuel line 42 and in the chamber 68 exceeds the maximum permissible pressure during the intake stroke of the piston 62. The opening pressure of the pressure relief valve 56 according to the invention can be set by selecting the depth at which the seat sleeve 102 is press-fitted into blind hole bore 69. The seat sleeve 102 is either press-fitted or welded into the blind hole bore 69 or is positioned and securely connected to the housing 58 in some other way.

Because the spring chamber 78 and therefore also the back side of the valve element 74 is acted on with the pressure prevailing in the delivery chamber 60, the valve element 74 does not lift away from the valve seat 72 during the delivery stroke of the high-pressure fuel pump 30, even if pressure pulsations occur in the delivery chamber 60 or in the high-pressure fuel line 42. Precisely stated, during the delivery stroke, the check valve 44 is open so that the pressure is the same in the high-pressure fuel line 42, the fourth branch line 70, the spring chamber 78, and the delivery chamber 60, and consequently, the hydraulic forces acting on the valve element 74 cancel each other out.

Only during the intake stroke, namely when the pressure in the delivery chamber 60 decreases and the check valve 44 closes, does a pressure differential arise between the sections 70a and 70b of the fourth branch line 70, which causes a resultant hydraulic force to be exerted on the valve element 74. If this resultant hydraulic force exceeds the closing force that the spring 76 exerts on the valve element 74, then the pressure relief valve 56 opens and an impermissibly high pressure in the high-pressure fuel line 42 is discharged into the delivery chamber 60 via the fourth branch line 70 and the pressure relief valve 56.

As can be inferred from the description of the first exemplary embodiment, the pressure relief valve 5 is embodied as simply as other pressure relief valves known from the prior art. Because of the connection according to the invention, the pressure relief valve 56 remains closed even when pressure pulsations occur during the delivery stroke of the high-pressure fuel pump 30. As a result, the pressure reduction occurs as desired during normal operation of the engine. Only if the pressure in the high-pressure fuel line 42 exceeds the opening pressure of the pressure relief valve 56 during the intake stroke of the high-pressure pump 30 does the pressure relief valve 56 open and thus permit a pressure reduction in the high-pressure fuel line 42.

Figure 3:
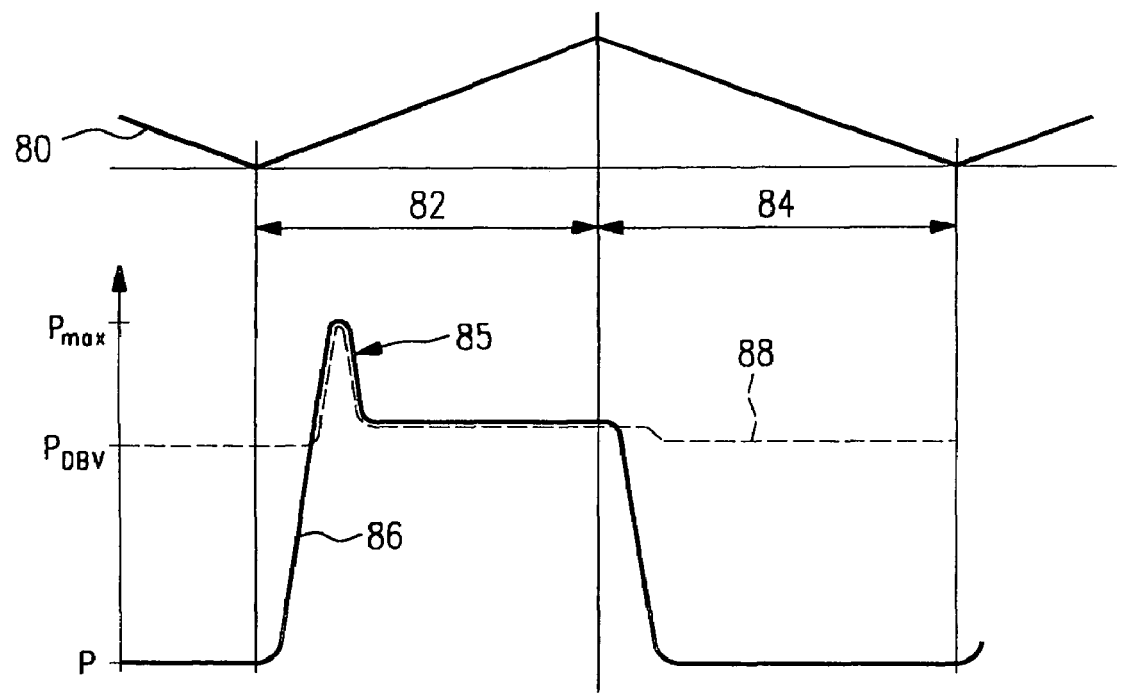
FIG. 3 is a graph in which the marches of pressure in the delivery chamber and high-pressure region of the fuel system are plotted over time.

In FIG. 3, the marches of pressure in the delivery chamber 60 and in the high-pressure fuel line 42 downstream of the check valve 44 are plotted over the stroke of the piston 62 of the high-pressure pump 30.

A first line 80 represents the path of the piston 62 in the bore 64. The movement from the lower dead center to the upper dead center is referred to as the delivery stroke and is indicated by the double arrow 82 in FIG. 3.

The path of the piston from upper dead center to lower dead center is referred to as the intake stroke 84.

A second solid line 86 represents the pressure in the delivery chamber 60. It is clear in FIG. 3 that a so-called pressure pulsation 85 is generated during the delivery stroke. That is, a pressure peak with a maximum value of $P_{max}$ is generated, which is significantly higher than an opening pressure $P_{DBV}$ of the pressure relief valve 56.

A dashed third line 88 is plotted in FIG. 3, which represents the pressure in the high-pressure line 42 downstream of the check valve 44 and in the section 70a of the fourth branch line 70. In FIG. 3, it is clear that the line 88, i.e. the pressure in the high-pressure fuel line 42, follows the pressure in the delivery chamber 60 (second line 86) during the delivery stroke 82, even if the pressure exceeds the opening pressure $P_{DBV}$ of the pressure relief valve 56. Only if the pressure in the delivery chamber 60 drops sharply during the intake stroke 84 (see the second solid line 86) can a pressure differential arise between the pressure in the high-pressure fuel line 42 and the pressure in the delivery chamber 60. In the operating state of the fuel system shown in FIG. 3, the pressure in the high-pressure fuel line 42 remains equal to the opening pressure $P_{DBV}$ of the pressure relief valve 56 during the intake stroke, whereas the pressure drops sharply in the delivery chamber 60. In other words: the pressure relief valve 56 prevents the occurrence of impermissibly high pressures during the intake stroke in that the fuel quantity delivered into the fuel accumulator 46 during the delivery stroke is discharged into the delivery chamber 60 again during the intake stroke.

Figure 4:
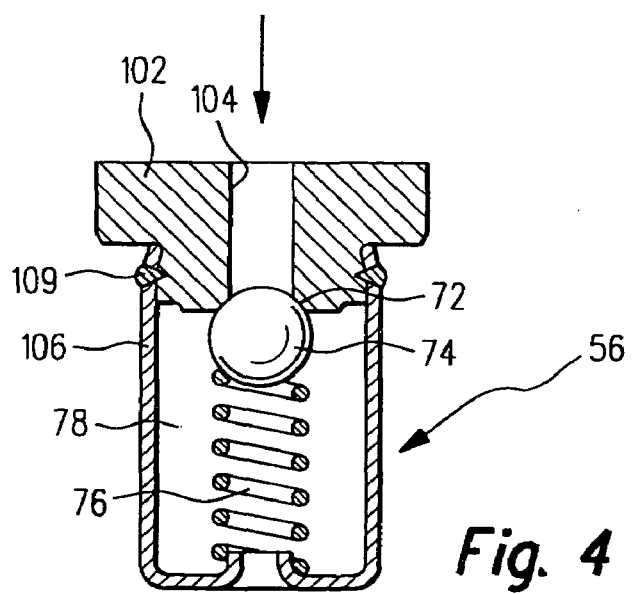
FIGS. 4 to 8 show other exemplary embodiments of pressure relief valves according to the invention.

The second exemplary embodiment of a pressure relief valve 56 according to the invention shown in FIG. 4 is embodied in the form of a preassembled component comprised of the seat sleeve 102 with a seat 72 and a bore 104 as well as a spring retainer 106, a spring 76, and a valve element 74. FIG. 4 shows a preassembled pressure relief valve 56 of this kind, outside the housing 58.

As is clear from FIG. 4, the spring retainer 106 is attached to the seat sleeve 102 by crimping and welding (see the welded seam 109). The spring 76 rests against the spring retainer 106 at one end and against the valve element 74 and the other end. If the seat sleeve 102 and the spring retainer 106 are attached to each other, then the opening pressure of the pressure relief valve 56 can be adjusted by compressing the spring retainer 106 slightly in the direction of its longitudinal axis. This increases the prestressing force that the spring 76 exerts on the valve element 74 and as a result, also increases the opening pressure of the pressure relief valve. Consequently, this pressure relief valve 56 according to the invention can be fully assembled and adjusted outside the high-pressure fuel pump 30. This is advantageous in terms of production cost. It also significantly reduces the variation in the operating behavior among different exemplars of mass-produced pressure relief valves 56 according to the invention.

Figure 5:
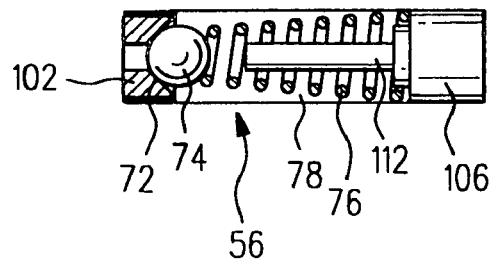

FIG. 5 shows another exemplary embodiment of a pressure relief valve 56 according to the invention, outside the housing 58. As in the other exemplary embodiments, the installation position of this exemplary embodiment corresponds to the installation position of the first exemplary embodiment.

The spring retainer 106 is inserted into the blind hole bore 69 (not shown in FIG. 5, see FIG. 2). Then the spring 76 and the seat sleeve 102 are mounted in the way described above. In this exemplary embodiment of a pressure relief valve 56 according to the invention, there is no direct connection between the seat sleeve 102 and spring retainer 106. A supporting arbor 112 is provided on the spring retainer 106 to prevent the spring 76 from moving out of the way laterally.

Figure 6:
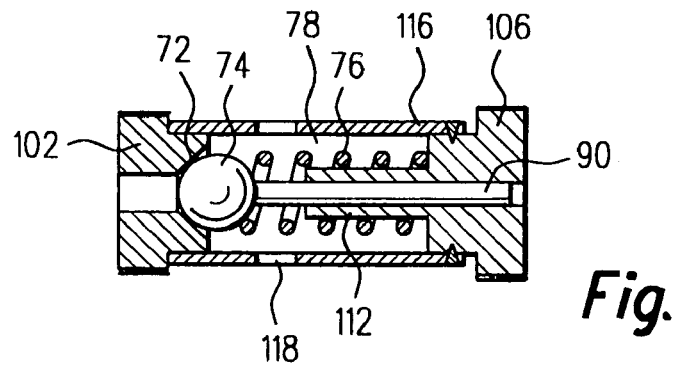

FIG. 6 shows another exemplary embodiment of a pressure relief valve 56 according to the invention. Components that are the same have been provided with the same reference numerals and that which has been said in relation to FIGS. 2, 4, and 5 applies correspondingly. By contrast with the first exemplary embodiment according to FIG. 2, for example, a dividing piston 90, which is guided in a sealed fashion in the spring retainer 106, is provided between the delivery chamber 60 and the valve element 74, which piston protrudes into the spring chamber 78, and rests against the valve element 74. In this exemplary embodiment, the spring retainer 106 is mounted far enough away from the bottom of the blind hole bore 69 that the spring retainer 106 hydraulically divides the spring chamber 78 from the bore 70b (see FIG. 2) and a coupling occurs exclusively via the dividing piston 90.

If a higher pressure prevails in the delivery chamber 60 than in the spring chamber 78, then the dividing piston 90 is moved in the direction of the valve element 74 and presses it into its seat 72. The provision of the dividing piston 90 reduces the dead volume in the delivery chamber 60 and thus improves the volumetric efficiency of the high-pressure pump 30.

In this exemplary embodiment, the spring chamber 78 is connected to an unpressurized leakage line or to the low-pressure fuel line 22 (see FIG. 1). This means that during the delivery stroke of the high-pressure pump 30, the dividing piston 90 presses against the valve element 74, thus preventing the pressure relief valve 56 from opening during the delivery stroke 82.

The diameters of the dividing piston 90 and valve seat 72 can also be selected to achieve a hydraulic boosting of the hydraulic force that the dividing piston 90 exerts on the valve element 74 during the delivery stroke. The dividing piston 90 maximizes the volumetric efficiency of the high-pressure fuel pump 30.

The exemplary embodiment of a pressure relief valve 56 according to FIG. 6, like the exemplary embodiment according to FIG. 4, can be fully assembled and adjusted outside the high-pressure pump 30 since a sleeve 116 with at least one lateral bore 118 is provided between the seat sleeve 102 and spring retainer 106. The sleeve 116 is welded to the spring retainer 106 and seat sleeve 102 when the prestressing of the spring 76 is sufficient to achieve a desired opening pressure of the pressure relief valve 56. Naturally, the sleeve 116 can also be attached to the spring retainer 106 and/or the seat sleeve 102 by means other than a welding seam 109.

Then the preassembled and adjusted pressure relief valve 56 is press-fitted as a compact unit into the blind hole bore 69.

The pressure relief valve according to the invention has the following main functions:

During normal operation, the system pressure of the fuel injection system when the engine is being overrun is limited if the pressure in the fuel accumulator 46 increases due to the fuel being heated by the engine heat.

During emergency running operation, for example if the quantity control valve 52 jams in a position in which the high-pressure fuel pump 30 always delivers the maximum delivery quantity, the system pressure of the fuel injection system is likewise limited.

In the exemplary embodiment according to FIG. 2, during overrunning operation when the quantity control valve is fully open (emergency running operation), the maximum amount of the fuel quantity delivered by the high-pressure fuel pump 30 can be discharged back into the delivery chamber 60. A pressure increase due to the heating of the fuel in the fuel accumulator 46 cannot be compensated for. It is therefore preferable in this instance for the injection valves 48 to inject enough fuel into the combustion chambers (not shown) to prevent an impermissible pressure increase in the high-pressure region of the fuel system 10.

Figure 7:
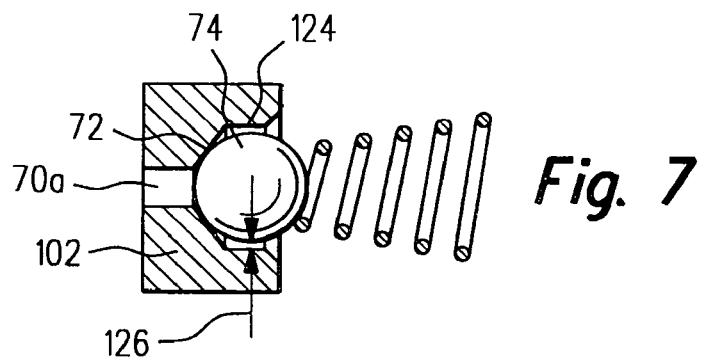
Figure 8:
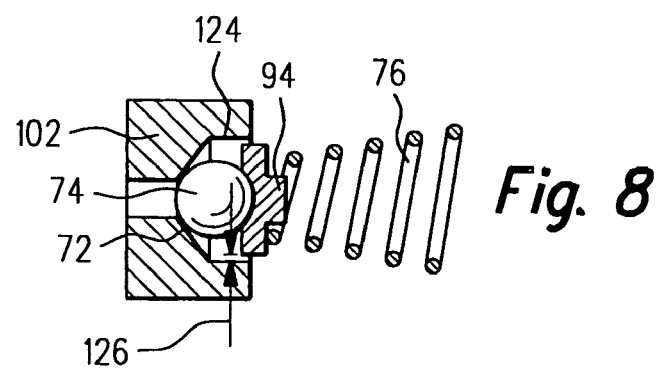

With the pressure relief valves 56 according to FIGS. 7 and 8, it is possible both during normal operation and during emergency running operation to discharge the entire fuel quantity and therefore achieve the pressure reduction under all circumstances, without additional intervention by the control unit of the motor control. It can be useful, however, to reduce the maximum engine speed during emergency running operation in order to have enough time for the pressure decrease in the fuel accumulator 46 during the intake phase of the high-pressure pump 30.

FIG. 7 shows a sectional view of another exemplary embodiment of a pressure relief valve 56 according to the invention. The exemplary embodiment according to FIG. 7 has parallels to the exemplary embodiment according to FIG. 2, so only the modifications according to the invention will be described here; otherwise, reference is made to the description given above with regard to FIG. 2. In the exemplary embodiment according to FIG. 7, the valve seat 72 adjoins a cylindrical guide section 124 in the seat sleeve 102, which guides the valve element 74 in the axial direction as soon as it has lifted away from the valve seat 72.

The diameter of the guide section 124 and the diameter of the valve element 74 embodied in the form of a ball are matched to each other so that an annular throttle gap 126 is formed between the valve element 74 and the guide section 124. This exemplary embodiment of a pressure relief valve according to the invention functions as follows:

During emergency running operation, if the pressure in the delivery chamber 60 decreases after the end of the delivery stroke, then the pressure relief valve 56 opens at the opening pressure established by the prestressing force of the spring 76 and the hydraulic force acting on the valve element 74. The fuel quantity flowing from the section 70a of the fourth branch line into the spring chamber 78 at the beginning of the opening of the pressure relief valve 56 is throttled in the throttle gap 126 and the entire projected area of the valve element 74 is subjected to the dynamic pressure. This leads to a very rapid opening movement of the valve element 74 and an abrupt increase in the flow cross section as soon as the valve element 74 has left the guide section 124 in the direction of the spring chamber 78 because the guide section 124 widens out into the spring chamber 78, which has a much larger diameter. Because of this rapid reaction of the pressure relief valve 56, a large quantity of fuel can flow out of the high-pressure region 14 and back into the delivery chamber 60 in a short time. The reaction behavior of the pressure relief valve 26 can be optimized and adapted to a particular application through the dimensioning of the throttle gap 126 and the length of the guide section 124. In the dimensioning of the throttle gap 126, however, it should be noted that when the pressure relief valve 56 reacts due to a pressure increase caused by the heating of the fuel during normal operation, no throttling occurs in the throttle gap 120 since otherwise, the pressure in the fuel accumulator 46 would abruptly decrease in accordance with the pressure step in the pressure relief valve 56. But since in this case, the overflow quantities are very low, the throttle gap 126 can be designed so as to achieve the function described at the beginning.

In the exemplary embodiment according to FIG. 8, the spring plate 94 and not the valve element 74 is guided in a guide section 124 of the housing 58. As a result, the throttle gap 126 is formed between the guide section 124 and the spring plate 94. This makes it possible to select the area exposed to the dynamic pressure, independent of the diameter of the valve element. This permits greater latitude in optimizing the dynamic behavior of the pressure relief valve 56. This structural measure solves the dilemma inherent in the fact that at high speeds (in the event of a malfunction due to a jammed quantity control valve 52), there is no longer enough time during the intake phase of the high-pressure pump 30 to completely discharge the fuel quantity supplied into the high-pressure region 14 back into the delivery chamber 60. Particularly during overrunning operation of the engine, the intake valve 34 would then always aspirate a particular fuel quantity and therefore the pressure in the fuel accumulator 46 could increase in an impermissible manner.

The exemplary embodiments according to FIGS. 7 and 8 in particular can prevent an impermissible pressure increase from occurring in the fuel accumulator 46, even if the quantity control valve 52 jams and/or the control unit malfunctions, since the pressure relief valves 56 permit a sufficiently large return flow of fuel from the high-pressure region 14 into the delivery chamber 60 during the intake stroke of the high-pressure pump 30.

All of the features explained in conjunction with the drawings, their description, and the claims can be essential to the invention both individually and in combination with one another.

The foregoing relates to preferred exemplary embodiments of the invention, it being understood that other variants and embodiments thereof are possible within the spirit and scope of the invention, the latter being defined by the appended claims.

We claim:

1. A high-pressure fuel pump (30) having a delivery chamber (60) delimited on one side by a piston (62) of the high-pressure fuel pump (30), the delivery chamber (60) being connected on the intake side via an intake valve (34) to a low-pressure fuel line (22) and on the pressure side via a high-pressure connection (63) to a high-pressure fuel line (42), wherein a check valve (44) and a pressure relief valve (56), connected parallel to the check valve (44), are provided between the delivery chamber (60) that is contained in a housing (58) and the high-pressure connection (63) that is connected to the housing (58) in a fluid-tight manner, both the check valve (44) and the pressure relief valve (56) having a center line disposed at approximately 90° to a center line of the piston (62), wherein the pressure relief valve (56) is contained in a blind hole bore (69) of the housing (58), and wherein the blind hole bore (69) starts from a chamber (68) delimited by the high-pressure connection (63) and the housing (58).

2. The high-pressure fuel pump according to claim 1, wherein the pressure relief valve comprises an inlet, an outlet and a valve element (74) that is prestressed in the direction of a valve seat (72), wherein the inlet is subjected to the pressure prevailing in the high-pressure fuel line (42), wherein starting at a particular pressure differential between the inlet and outlet, the valve element (74) connects the inlet and outlet hydraulically, and wherein the outlet of the pressure relief valve (56) is hydraulically connected to the delivery chamber (60) of the high-pressure pump (30).

3. The high-pressure fuel pump according to claim 1, wherein the pressure relief valve (56) is embodied in the form of a seat valve or a slide valve.

4. The high-pressure fuel pump according to claim 2, wherein the pressure relief valve (56) is embodied in the form of a seat valve or a slide valve.

5. The high-pressure fuel pump according to claim 1, wherein the pressure relief valve (56) comprises the housing (58) with a valve element (74), a valve seat (72) and a spring chamber (78), wherein the spring chamber (78) contains a spring (76) that rests against the housing (58) at one end and rests against the valve element (74) at the other end, wherein the spring chamber (78) is hydraulically connected to an outlet (70*b*), in that the valve seat (72) is disposed in a seat sleeve (102), and wherein the seat sleeve (102) is attached in the blind hole bore (69) of the housing (58).

6. The high-pressure fuel pump according to claim 2, wherein the pressure relief valve (56) comprises the housing (58) with the valve seat (72) and a spring chamber (78), wherein the spring chamber (78) contains a spring (76) that rests against the housing (58) at one end and rests against the valve element (74) at the other end, wherein the spring chamber (78) is hydraulically connected to the outlet (70*b*), in that the valve seat (72) is disposed in a seat sleeve (102), and wherein the seat sleeve (102) is attached in the blind hole bore (69) of the housing (58).

7. The high-pressure fuel pump according to claim 5, wherein the seat sleeve (102) is press-fitted and/or welded into the blind hole bore (69).

8. The high-pressure fuel pump according to claim 1, wherein the pressure relief valve (56) has a valve element (74), a valve seat (72) and a spring retainer (106), and wherein between the spring retainer (106) and the valve seat (72), a spring (76) is provided, which rests against the spring retainer (106) at one end and rests against the valve element (74) at the other end.

9. The high-pressure fuel pump according to claim 2, wherein the pressure relief valve (56) has a spring retainer (106), and wherein between the spring retainer (106) and the valve seat (72), a spring (76) is provided, which rests against the spring retainer (106) at one end and rests against the valve element (74) at the other end.

10. The high-pressure fuel pump according to claim 8, wherein the spring retainer (106) is attached to the valve seat (72).

11. The high-pressure fuel pump according to claim 2, wherein the pressure relief valve (56) has a spring retainer (106) and wherein the spring retainer (106) is attached to the valve seat (72).

12. The high-pressure fuel pump according to claim 8, wherein the spring retainer (106) is disposed at the bottom of the blind hole bore (69).

13. The high-pressure fuel pump according to claim 10, wherein the spring retainer (106) is disposed at the bottom of the blind hole bore (69).

14. The high-pressure fuel pump according to claim 8, wherein the spring retainer (106) includes a supporting arbor (112).

15. The high-pressure fuel pump according to claim 2, wherein the valve seat (72) adjoins a guide section (124) and in that a throttle gap (126) is formed between the guide section (124) and the valve element (74).

16. The high-pressure fuel pump according to claim 2, wherein the pressure relief valve further comprises a spring plate (94) resting against the valve element (74) and wherein the valve seat (72) adjoins a guide section (124) and in that a throttle gap (126) is formed between the guide section (124) and the spring plate (94).

17. The high-pressure fuel pump according to claim 1, wherein the high-pressure fuel pump (30) is a one-cylinder piston pump.

* * * * *